(12) United States Patent
Yamasaki et al.

(10) Patent No.: US 7,463,308 B2
(45) Date of Patent: Dec. 9, 2008

(54) DATA SLICER CIRCUIT

(75) Inventors: Shinichi Yamasaki, Saitama (JP);
Masanori Okubayashi, Gunma (JP)

(73) Assignee: Sanyo Electric Co., Ltd., Osaka (JP)

( * ) Notice: Subject to any disclaimer, the term of this patent is extended or adjusted under 35 U.S.C. 154(b) by 456 days.

(21) Appl. No.: 10/952,366

(22) Filed: Sep. 29, 2004

(65) Prior Publication Data
US 2005/0110903 A1 May 26, 2005

(30) Foreign Application Priority Data
Sep. 29, 2003 (JP) ............................. 2003-338040

(51) Int. Cl.
*H04N 7/00* (2006.01)

(52) U.S. Cl. ..................... 348/465; 348/466; 348/467; 348/468

(58) Field of Classification Search .......... 348/465–468
See application file for complete search history.

(56) References Cited

U.S. PATENT DOCUMENTS

| 5,483,289 | A | * | 1/1996 | Urade et al. ................. 348/468 |
| 5,517,249 | A | * | 5/1996 | Rodriguez-Cavazos et al. .. 348/465 |
| 5,666,167 | A | * | 9/1997 | Tults ........................... 348/465 |
| 5,715,011 | A | * | 2/1998 | Bramwell ................... 348/465 |
| 5,832,039 | A | * | 11/1998 | Rijns ........................... 375/317 |
| 6,172,534 | B1 | * | 1/2001 | Brierley ........................ 327/58 |
| 6,281,934 | B1 | * | 8/2001 | Nakatani ..................... 348/465 |
| 6,381,287 | B1 | * | 4/2002 | Shin ............................. 375/316 |
| 6,462,782 | B1 | * | 10/2002 | Honda et al. ................. 348/465 |
| 6,784,943 | B1 | * | 8/2004 | Tults ........................... 348/465 |
| 6,839,091 | B1 | * | 1/2005 | Hebbalalu et al. ............ 348/465 |
| 6,912,009 | B2 | * | 6/2005 | Orii ............................. 348/465 |
| 2002/0008776 | A1 | * | 1/2002 | Kuzumoto et al. ........... 348/468 |
| 2002/0090204 | A1 | * | 7/2002 | Matsumoto .................. 386/84 |
| 2003/0179316 | A1 | * | 9/2003 | Morooka ..................... 348/468 |
| 2003/0184677 | A1 | * | 10/2003 | Kuzumoto et al. ........... 348/465 |
| 2004/0041944 | A1 | * | 3/2004 | Matsumoto .................. 348/465 |
| 2004/0104834 | A1 | * | 6/2004 | Enami ......................... 341/155 |
| 2006/0268170 | A1 | * | 11/2006 | Suzuki et al. ................ 348/465 |

FOREIGN PATENT DOCUMENTS

| JP | 55-082576 | 6/1980 |
| JP | 59-152882 | 10/1984 |
| JP | 60-27531 | 2/1985 |
| JP | 62-084687 | 4/1987 |
| JP | 11-041552 | 2/1999 |

OTHER PUBLICATIONS

Notification Of Reasons For Refusal issued Apr. 30, 2008 in JP Pat. App. No. 2003-338040, and English-language translation.

* cited by examiner

*Primary Examiner*—Brian P Yenke
(74) *Attorney, Agent, or Firm*—Fish & Richardson P.C.

(57) ABSTRACT

A data slicer circuit is disclosed which comprises a control circuit to output a digital signal that increases or decreases by a constant value difference depending on the level of an input signal when the input signal is sampled at a given frequency; a conversion circuit to convert the digital signal to an analog signal; and a comparison circuit to compare the video signal with the analog signal, the comparison circuit outputting the result of the comparison as the input signal to the control circuit, wherein the analog signal corresponding to the result of the comparison of the comparison circuit is used as a slice level for separating the data from the video signal.

13 Claims, 6 Drawing Sheets

DATA SLICER CIRCUIT

CROSS-REFERENCE TO RELATED APPLICATIONS

The present application claims priority upon Japanese Patent Application No. 2003-338040 filed on Sep. 29, 2003, which is herein incorporated by reference.

BACKGROUND OF THE INVENTION

1. Field of the Invention

The present invention relates to a data slicer circuit.

2. Description of the Related Art

The teletext system used in Europe is among systems for superimposing data indicative of characters and others on a video signal to be received by a television receiver. Teletext is a technique of superimposing and transmitting data indicative of characters and others during vertical blanking intervals of the video signal. To observe characters and others on the television receiver, a circuit is required to separate data from the incoming video signal, and the data slicer circuit serves the function of separating this superimposed data from the video signal. Teletext has a clock-run-in signal ("pulse signal") indicating the presence/absence of data, and the data slicer circuit separates data from the video signal by setting the midpoint of the amplitude of the clock-run-in signal defined in advance as a slice level and using the slice level as a reference.

If, however, the video signal undergoes a tuning deviation or a change in receiving condition due to the TV receiver, the clock-run-in signal may change its waveform. This makes it impossible for the data slicer circuit to accurately separate data as the slice level is no longer at the midpoint of the amplitude of the clock-run-in signal as a result of distortion of the waveform of the clock-run-in signal or variations in amplitude thereof. For this reason, a data slicer circuit is suggested that is capable of accurately determining a slice level and reading out data even in the event of a change in waveform of the clock-run-in signal (see, e.g., Japanese Patent Application Laid-Open Publication No. Hei. 11-41552).

FIG. 6 is a block diagram showing a conventional data slicer circuit.

The conventional data slicer circuit has a peak hold circuit 90 for holding the upper peak voltage of the clock-run-in signal, a peak hold circuit 91 for holding the lower peak voltage of the clock-run-in signal, resistors R1 and R2 equal in resistance and a comparator 41. And, the peak hold circuits 90 and 91 each have a comparator, an op-amp, a resistor and a capacitor that are not shown.

A video signal is supplied not only to the positive (non-inverting input) terminal of the comparator 41 but also to the peak hold circuits 90 and 91. The difference of the upper peak value detected by the peak hold circuit 90 and the lower peak value detected by the peak hold circuit 91 are voltage-divided between the resistors R1 (approx. 10 KΩ) and R2 (approx. 10 KΩ). The intermediate voltage produced by dividing the voltage between the resistors R1 and R2 is supplied to the negative (inverting input) terminal of the comparator 41 as a slice level for extracting binary data consisting of logic values 1's and 0's from the data representing characters and other information. Then, the video signal and the slice level are compared by the comparator 40, outputting the comparison result as "HIGH (logic 1)" or "LOW (logic 0)."

FIG. 7 is a waveform diagram showing the operation of the conventional data slice circuit. The upper peak value of the clock-run-in signal is detected by the peak hold circuit 90, whereas the lower peak value of the clock-run-in signal is detected by the peak hold circuit 91. The slice level is determined by calculating the midpoint between the upper and lower peak values. This makes it possible to retain the slice level at the midpoint level of the amplitude of the clock-run-in signal even in the event of a distortion or change in the amplitude of the clock-run-in signal.

In such a conventional data slicer circuit, two peak hold circuits are required to detect the upper and lower peak values of the clock-run-in signal. Each of the peak hold circuits contains an op-amp, a capacitor and a resistor that are large in area, resulting in a large circuit and giving rise to a problem of large chip size when integrated into a chip. Besides, the conventional data slicer circuit has the problem of increased manufacturing cost.

SUMMARY OF THE INVENTION

It is therefore an object of the present invention to provide a data slicer circuit that can detect the midpoint level in the amplitude of the clock-run-in signal without using peak hold circuits and that thereby allow reduction in circuit size and in chip area in the case of integration into an integrated circuit.

In order to achieve the above object, according to a major aspect of the present invention there is provided a data slicer circuit for separating, by using a pulse signal indicative of the presence/absence of data superimposed during specific scan periods of a video signal, the data from the video signal, the data slicer circuit comprising a control circuit to output a digital signal that increases or decreases by a constant difference in value depending on the level of an input signal when the input signal is sampled at a given frequency; a conversion circuit to convert the digital signal to an analog signal; and a comparison circuit to compare the video signal with the analog signal, the comparison circuit outputting the result of comparison as the input signal to the control circuit, wherein the analog signal corresponding to the result of comparison of the comparison circuit is used as a slice level for separating the data from the video signal.

Features and objects of the present invention other than the above will become clear by reading the description of the present specification with reference to the accompanying drawings.

BRIEF DESCRIPTION OF THE DRAWINGS

For a more complete understanding of the present invention and the advantages thereof, reference is now made to the following description taken in conjunction with the accompanying drawings wherein.

DETAILED DESCRIPTION OF THE INVENTION

At least the following matters will be made clear by the explanation in the present specification and the description of the accompanying drawings.

<Configuration of Data Slicer Circuit>

While the present invention is applicable to a variety of systems using the clock-run-in signal to superimpose characters and other data on a video signal, a description of this embodiment will be made of a case where data is separated in the teletext system.

Figure 1:
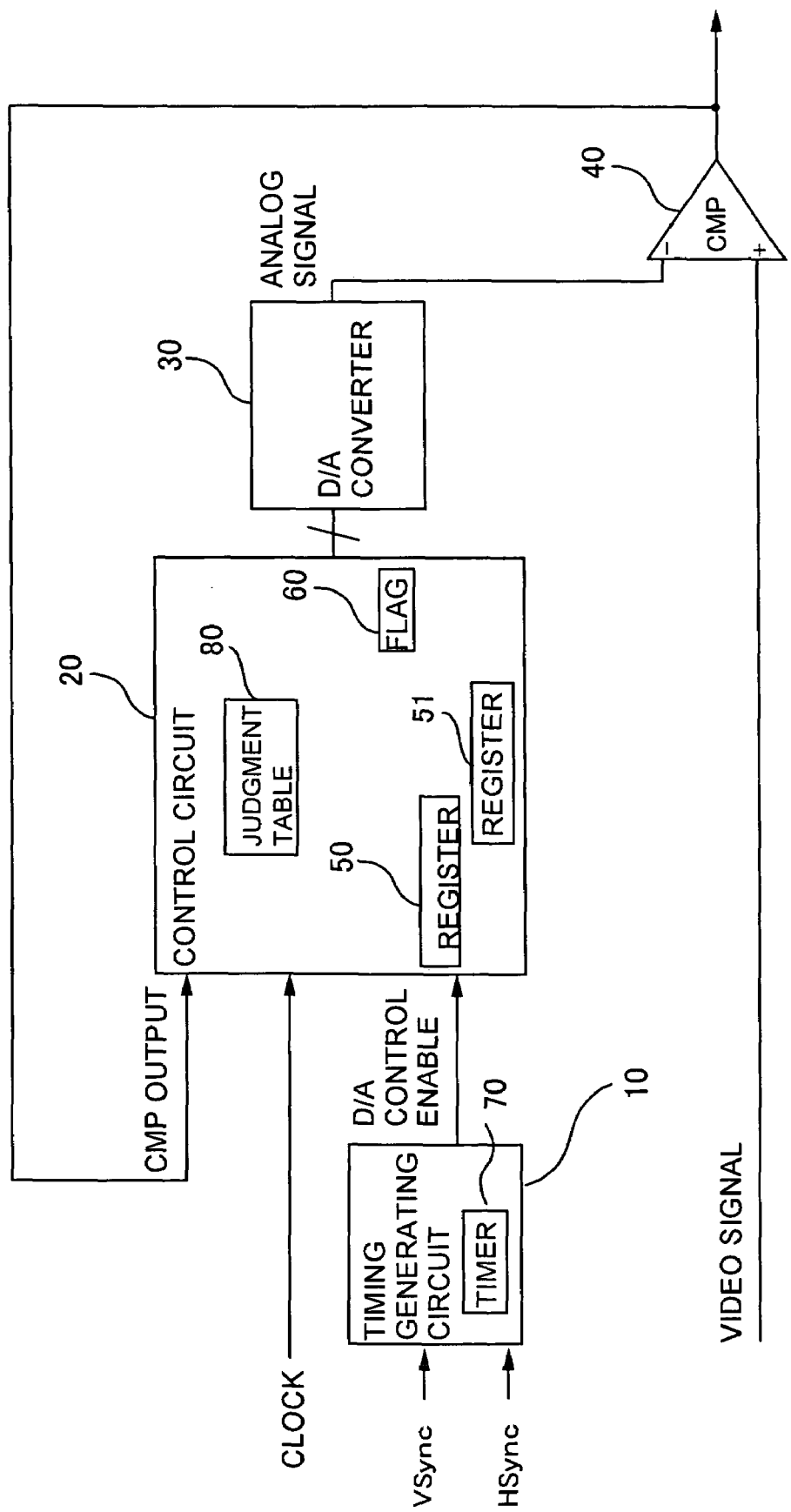
FIG. 1 is a block diagram of a data slicer circuit according to the present invention.

FIG. 1 is a block diagram of a data slicer circuit according to an embodiment of the present invention. As shown in the figure, the data slicer circuit has a timing generating circuit 10, a control circuit 20, a D/A converter ("conversion circuit") 30 and a comparator ("comparison circuit") 40.

The timing generating circuit 10 generates, from a vertical synchronizing signal VSync and a horizontal synchronizing signal HSync contained in the video signal, a D/A control enable signal for enabling the operation of the control circuit 20 (transition from "LOW" to "HIGH"). As a result of the generation of the D/A control enable signal, the control circuit 20 is enabled to operate (enabled to perform D/A control). It is to be noted that the timing generating circuit 10 has a timer 70, with the timing for the D/A control enable signal to change from "LOW" to "HIGH" adjusted by the timer 70.

The control circuit 20 samples the output value of the comparator 40 during a period when D/A control is enabled (when the D/A control enable signal is "HIGH"), outputting to the D/A converter 30 a digital signal that increases or decreases by a constant value difference. The frequency of this sampling is set so as to be several times the clock input (e.g., four times). It is to be noted that the control circuit 20 has a register ("first hold circuit") 50 for storing a digital signal value corresponding to an analog signal value that is the upper peak value of the output of the D/A converter 30, a register ("second hold circuit") 51 for storing a digital signal value corresponding to an analog signal value that is the lower peak value, a flag 60 that takes on "1" or "0" depending on the increase/decrease of the digital signal, and a judgment table 80 in which information is stored about the increase/decrease ratio of digital signal corresponding to the duty cycle of the output of the comparator 40. The control circuit 20 sets the value of the flag 60 to "1" or "0" depending on the CMP output. That is, the flag 60 is at "1" when the CMP output is "HIGH" and "0" when the CMP output is "LOW."

The D/A converter 30 converts the digital signal output by the control circuit 20 to a corresponding analog signal.

A video signal is input to the positive (non-inverting input) terminal of the comparator 40, whereas an analog signal is input to the negative (inverting input) terminal. The comparator 40 compares the video and analog signals in magnitude and, as a result, outputs "HIGH" when the video signal is greater than the analog signal and "LOW" when the video signal is smaller than the analog signal.

This makes it possible to use the analog signal, a signal that increases or decreases depending on the CMP output, as the slice level, thus eliminating the need to detect the midpoint between the upper and lower peaks as the slice level.

<Data Slicer Operation>

Figure 2:
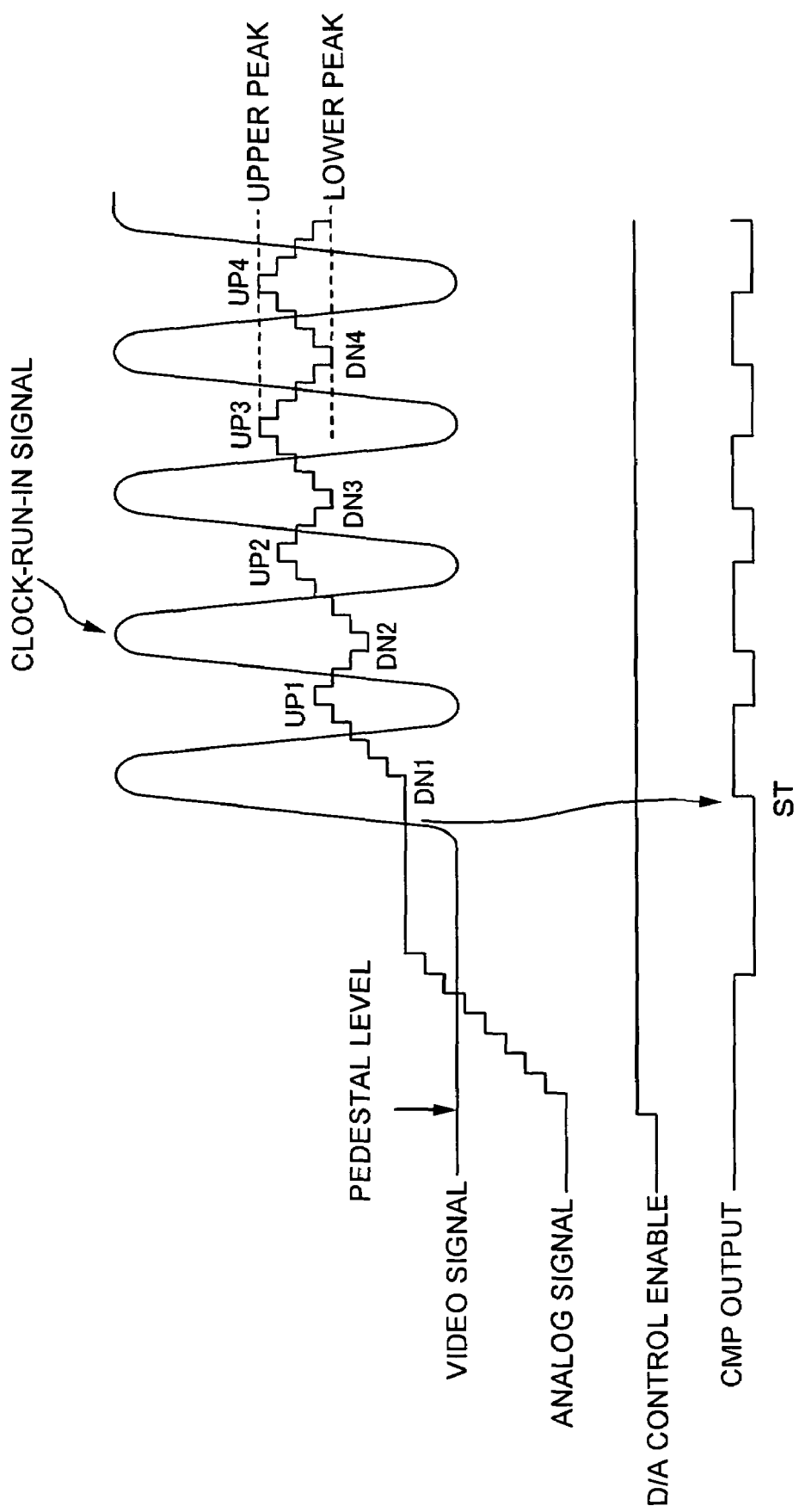
FIG. 2 shows an example of a waveform diagram for describing the operation of the data slicer circuit according to the present invention when a clock-run-in signal is inputted.

FIG. 2 shows waveforms for describing the operation of the data slicer circuit according to the embodiment of the present invention. In the figure, a relationship is shown between the video and analog signal waveforms when the clock-run-in signal is input.

The video signal is at the pedestal level (reference voltage irrelevant to the amplitude of the video signal) prior to the input of the clock-run-in signal, whereas the analog signal is at lower levels than the pedestal level. When the HSync, indicating input of the clock-run-in signal, is input to the timing generating circuit 10, the timer 70 causes the D/A control enable signal to change from "LOW" to "HIGH", enabling the control circuit 20 to operate (to perform D/A control). As shown in the figure, at this point in time, the video signal is larger than the analog signal, with the output value of the comparator 40 (CMP output) being "HIGH."

The CMP output is sampled by the control circuit 20. Since the CMP output is "HIGH" at this time, the digital signal increases by a constant value difference. The D/A converter 30 outputs an analog signal corresponding to the digital signal to the comparator 40. Therefore, the analog signal increases at a constant interval.

With a slight difference in timing from when the analog signal becomes greater in level than the video signal, the CMP output becomes "LOW", and further with a slight difference in timing, the analog signal stops increasing. Thereafter, the analog signal maintains that level until a clock-run-in signal is input. Thus, immediately prior to the input of the clock-run-in signal, the analog signal is higher than the video signal. The analog signal is maintained higher than the video signal because if the clock-run-in signal is input when the analog signal is lower than the video signal, the CMP output remains unchanged despite increase of the video signal from the pedestal level, leaving input of the clock-run-in signal undetected. Thus, the analog signal is raised above the pedestal level prior to the input of the clock-run-in signal to make sure of the detection of the difference from the video signal.

Then, the clock-run-in signal is input, and when the video signal becomes greater than the analog signal, the CMP output becomes "HIGH" with a slight difference in timing (delay time due to the circuit). The control circuit 20 samples the CMP output at N times that of the clock-run-in signal. At this time, the CMP output is "HIGH", thus resulting in the digital signal increasing by a constant value difference. The flag 60 is at "1" because the CMP output is "HIGH." The D/A converter 30 outputs an analog signal corresponding to the digital signal to the comparator 40. Therefore, the analog signal increases at a constant interval in a stepped manner.

Then, when the analog signal becomes greater than the video signal, the CMP output becomes "LOW" with a slight difference in timing (delay time due to the circuit). The control circuit 20 samples the CMP output at N times that of the clock-run-in signal. At this time, the CMP output is "LOW", thus resulting in the digital signal decreasing by a constant value difference. The flag 60 is at "0" because the CMP output is "LOW." The D/A converter 30 converts the digital signal to a corresponding analog signal and outputs the analog signal to the comparator 40. Therefore, the analog signal decreases at a constant interval in a stepped manner.

This ratio of increase to decrease in the analog signal is dependent on the duty cycle of the CMP output (percentage of "HIGH" in the CMP output cycle). That is, when the analog signal is located below the clock-run-in signal in the video signal, a higher percentage of the CMP output cycle is "HIGH", with a lower percentage of the CMP output cycle being "LOW." In the increase and decrease of the analog signal, therefore, there are more increases than decreases, resulting in the analog signal increasing. Several repetitions of the above operation brings the stepped waveform of the analog signal, which was located on the lower side of the amplitude of the clock-run-in signal, close to the midpoint of the amplitude of the clock-run-in signal. That is, the output of the comparator 40 comes close to 50% duty cycle.

The upper and lower peak values of the analog signal can be determined by a change in the flag 60 within the control circuit 20. When the flag 60 is at "1", the analog signal is on the increase. When the flag 60 is at "0", the analog signal is on the decline. Consequently, the point at which the flag 60 changes from "1" to "0" coincides with the upper peak value of the analog signal, whereas the point at which the flag 60 changes from "0" to "1" coincides with the lower peak value.

Meanwhile, the register 50 within the control circuit 20 stores a digital signal value corresponding to the upper peak value of the analog signal, whereas the register 51 stores a digital signal value corresponding to the lower peak value of the analog signal. It is possible to assume that after, for example, four repetitions of the cycle of the analog signal, the analog signal is close to the midpoint of the amplitude of the clock-run-in signal, the digital signal values corresponding to UP4 and DN4 in FIG. 2 are stored in the registers 50 and 51 in the present embodiment. The UP4 and DN4 (upper and lower peak values) are the peak values of the amplitude waveform of the analog signal corresponding respectively to the fourth falling edge and the third rising edge from the change in the CMP output (ST) indicating input of the clock-run-in signal.

Once the upper and lower peak values are set, the analog signal is controlled to be within the range of the upper to the lower peak value by the control circuit 20 so that no value beyond either of the peak values is output.

Figure 3:
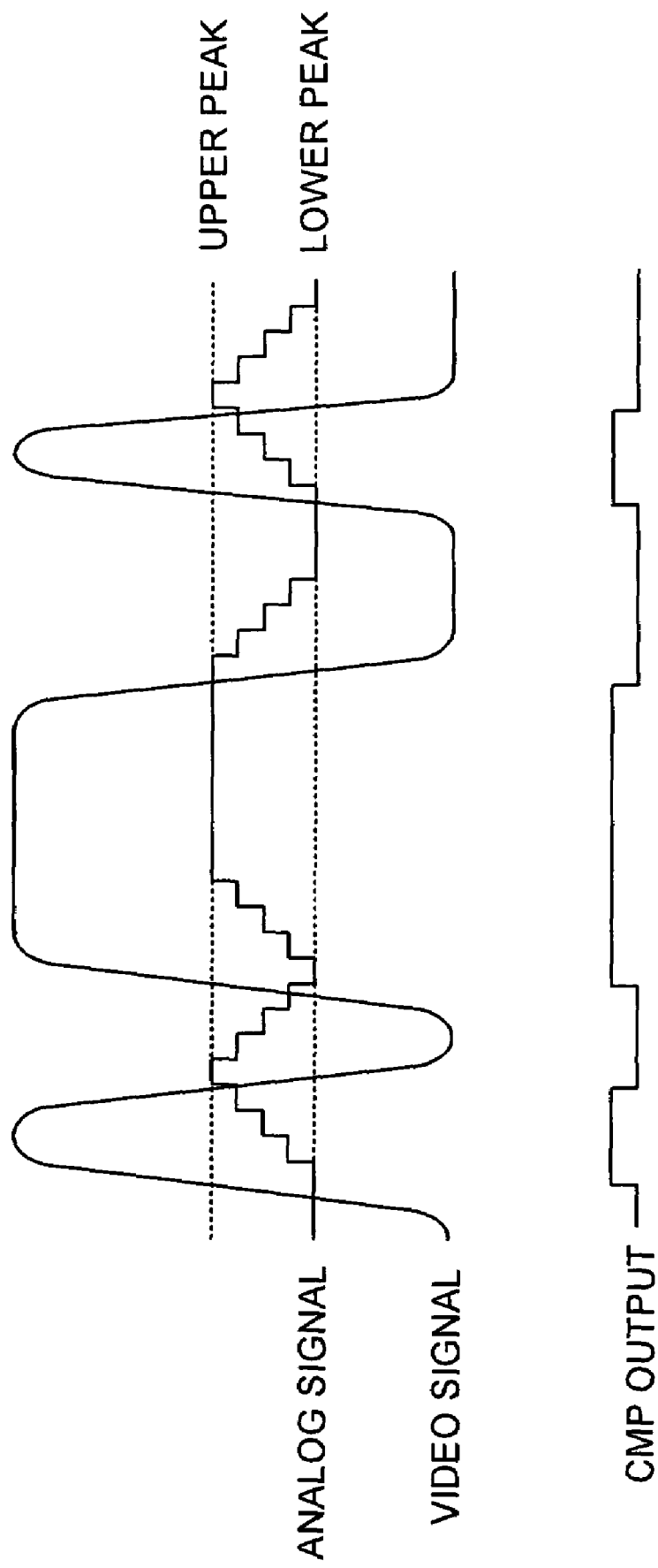
FIG. 3 shows an example of a waveform diagram for describing the operation of the data slicer circuit according to the present invention when a data signal is inputted.

FIG. 3 shows waveforms for describing the operation of the data slicer circuit when a signal having data superimposed thereon is input.

The upper and lower peak values of the analog signal are the values set in FIG. 2, i.e., the UP4 and DN4. While increasing or decreasing depending on the video signal in a stepped manner as in FIG. 2, the analog signal is held, when having reached the upper peak value (UP4), at that value and controlled by the control circuit 20 so as not to increase beyond the upper peak value. As the analog signal falls below the upper peak value with change in the video signal, it decreases in a stepped manner. And when having reached the lower peak value (DN4), the analog signal is held at that value and controlled by the control circuit 20 so as not to decline below the lower peak value. On the basis of which is larger or smaller of the analog signal obtained from these operations and the video signal, multi-bit data is generated to consist of logic values "0" or "1", that is, is extracted as character or other data. Thus, by setting the upper and lower peak values and controlling the analog signal so as not to exceed the peak values, it is possible to extract data using the analog signal as the slice level.

OTHER EMBODIMENTS

Figure 4:
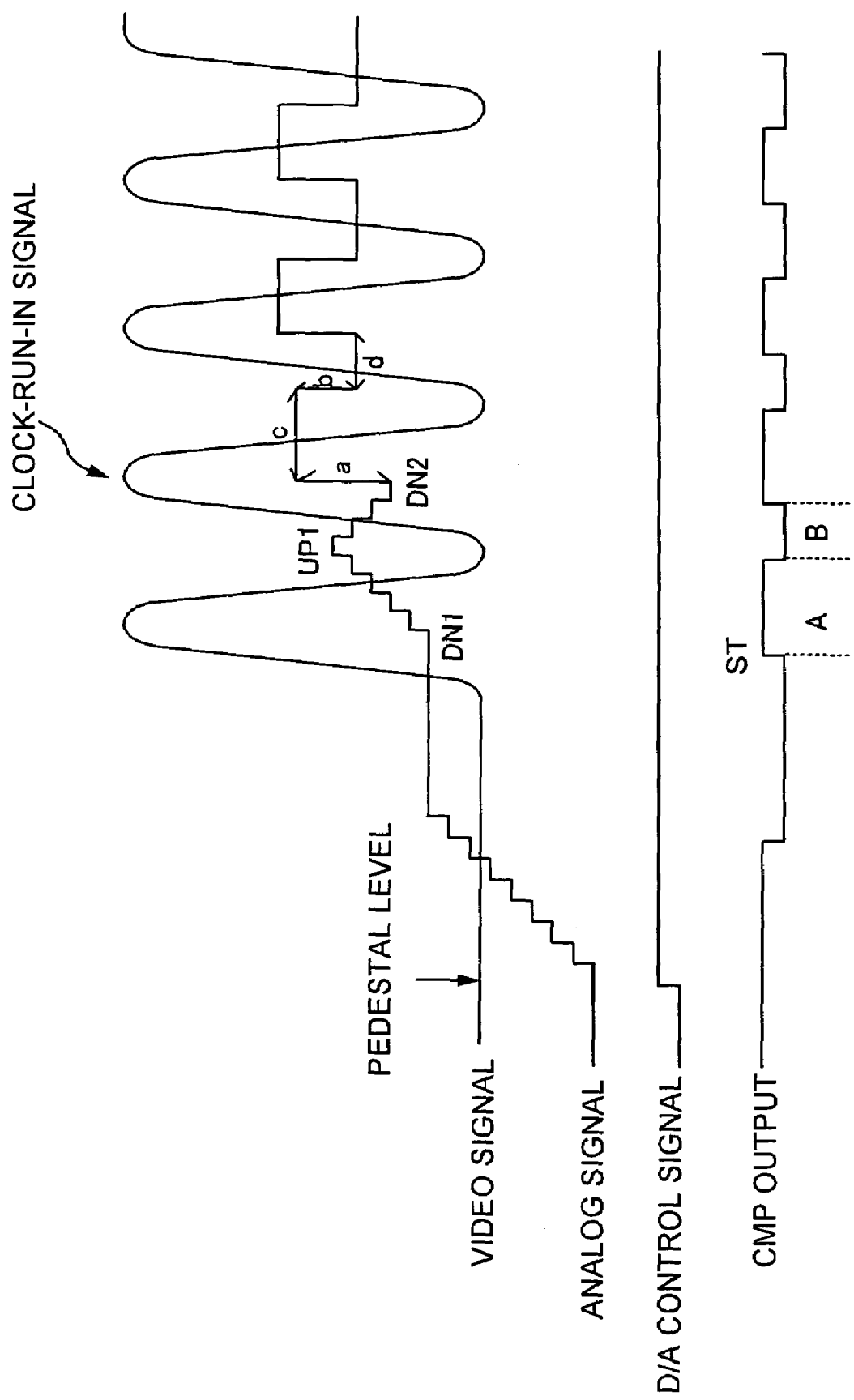
FIG. 4 shows a second example of a waveform diagram for describing the operation of the data slicer circuit according to the present invention when the clock-run-in signal is inputted.

FIG. 4 shows waveforms for describing the operation of the data slicer circuit according to a second embodiment of the present invention. Waveforms from DN1, at which the analog signal begins to increase following the input of the clock-run-in signal, to DN2 are the same as in FIG. 2 of the first embodiment.

To bring the analog signal close to the midpoint of the amplitude of the video signal, the control circuit 20 sets, according to the duty cycle (percentage of "HIGH" in the CMP output cycle) of the first cycle (from ST, indicating input of the clock-run-in signal, to the next rising edge) of the CMP output, an increment and decrement of the analog signal, thus increasing and decreasing the analog signal to form a rectangular waveform.

Letting the "HIGH" portion of the first cycle of the CMP output be A and the "LOW" portion be B in the figure, for example, an increment a of the analog signal in the rectangular portion is proportional to $A/(A+B)$, whereas a decrement b of the analog signal is proportional to $B/(A+B)$. As shown in the figure, when the analog signal is located on the lower side of the amplitude of the clock-run-in signal, $A>B$. Therefore, a is greater than b. That is, there are more increases than decreases in the rectangular change portion of the analog signal, thus allowing the analog signal to become closer to the center of the amplitude of the clock-run-in signal. Information on the increment and decrement of the analog signal corresponding to the A-to-B ratio is stored in advance in the judgment table 80 of the control circuit 20. The larger the difference between A and B, the larger the difference between a and b. That is, the rate at which the analog signal increases becomes greater.

It is to be noted that the analog signal is held for given time periods following increase and decrease of the analog signal in the rectangular waveform portion. This hold time is determined by the A-to-B ratio as with increment and decrement of the analog signal. That is, a hold time c following increase of the analog signal in the figure is equal to one period of the clock-run-in signal×$A/(A+B)$, whereas a hold time d following decrease of the analog signal is equal to one period of the clock-run-in signal×$B/(A+B)$.

The same operation continues on the next and succeeding cycles. That is, by setting the amounts of change by which the analog signal increases and decreases according to the duty cycle of the CMP output in the preceding cycle, and by increasing and decreasing the analog signal by the increment and the decrement to form a rectangular waveform, the analog signal is brought close to the midpoint of the amplitude of the clock-run-in signal, i.e., 50% duty cycle (same percentages of "HIGH" and "LOW" in the CMP output).

As a result of increase and decrease in a rectangular manner, it is possible to reduce the number of times the analog signal changes, thus reducing power consumption as compared with the increase and decrease of the analog signal in a stepped manner.

Figure 5:
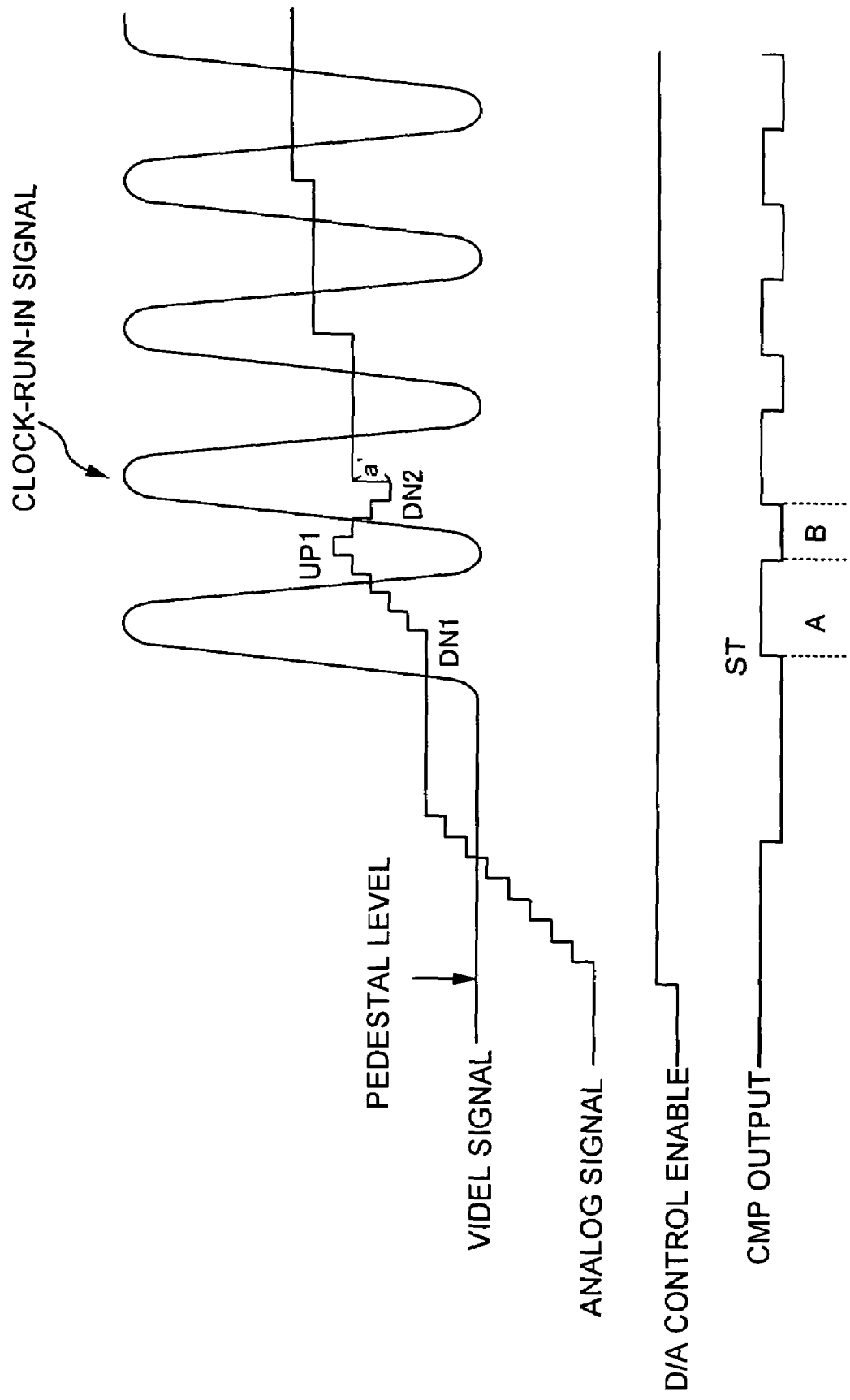
FIG. 5 shows a third example of a waveform diagram for describing the operation of the data slicer circuit according to the present invention when the clock-run-in signal is inputted.
Figure 6:
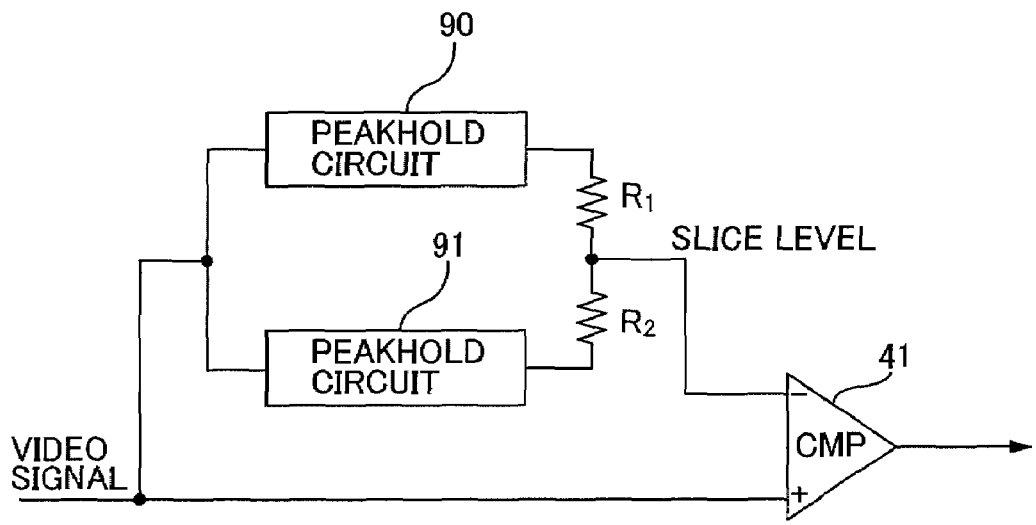
FIG. 6 is a block diagram of a conventional data slicer circuit.
Figure 7:
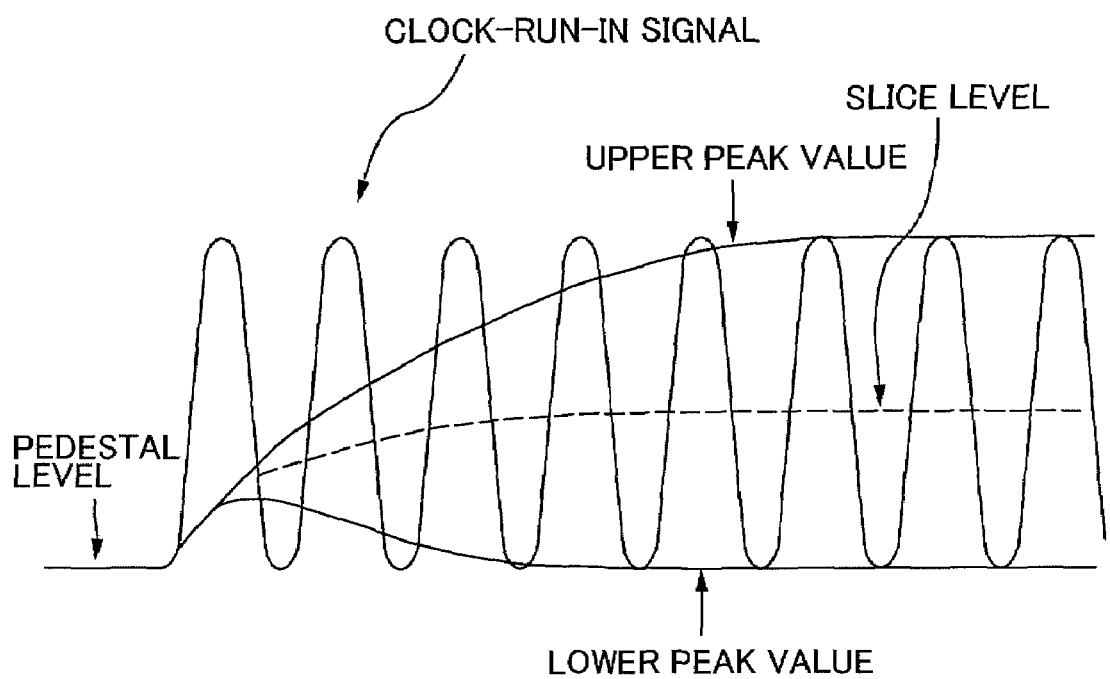
FIG. 7 shows an example of a waveform diagram for describing the operation of the conventional data slicer circuit when the clock-run-in signal is inputted.

FIG. 5 shows waveforms for describing the operation of the data slicer circuit according to a third embodiment of the present invention. Waveforms from DN1, at which the analog signal begins to increase following the input of the clock-run-in signal, to DN2 are the same as in FIG. 2 of the first embodiment.

The control circuit 20 controls the analog signal so as to bring the signal close to 50% duty cycle by either repeatedly increasing or decreasing the analog signal. Letting the "HIGH" portion of the first cycle of the CMP output be A and the "LOW" portion be B in the figure, for example, an increment a' of the analog signal is set according to the A-to-B ratio. When $A>B$, a' is positive, thus causing the analog signal to increase. Conversely, when $A<B$, a' is negative, thus causing the analog signal to decline. Since $A>B$ in the present embodiment, a' is positive, thus causing the analog signal to increase as shown in the figure. This increment (decrement) according to the A-to-B ratio is stored beforehand in the judgment table 80 of the control circuit 20, and the larger the difference between A and B, the larger the absolute value of a'. That analog signal value is retained for a time corresponding to one period of the clock-run-in signal following increase (decrease) of the analog signal.

The same operation continues on the next and succeeding cycles. That is, by adjusting the increment or decrement of the analog signal depending on the duty cycle of the CMP output on the preceding cycle, the analog signal is varied so as to come close to 50% duty cycle. That is, the analog signal value comes close to the midpoint of the amplitude of the clock-run-in signal. It is possible through the above operation to reduce the number of times the analog signal is varied and the amount of change in the analog signal.

It is to be noted that while in the present embodiment, a method was described of separating data in the teletext system using the present invention, it is possible to separate character data from the video signal using the present invention similarly in the closed caption system in which caption data is superimposed in horizontal scan periods (21H) of the video signal.

As described above, it is possible, according to the present embodiment, to bring the analog signal close to the midpoint of the amplitude of the clock-run-in signal according to the duty cycle of the output of the comparator 40, and thus data can be separated from the video signal using this analog signal as the slice level. Therefore, no op-amps, capacitors or resistors, contained in a peak hold circuit and large in area, are used, thus making it possible to reduce the circuit size and the chip area in the case of integration into a chip.

Furthermore, it becomes unnecessary, by storing the upper and lower peak values in a given cycle of the analog signal and increasing and decreasing the analog signal in the range thereof, to detect as a slice level the midpoint between the upper and lower peak values of the clock-run-in signal, thus allowing easy extraction of data. The peak positions of the analog signal can be detected using the flag that changes between "1" and "0" in response to the change between the increase and decrease of the digital signal. While the analog signal undergoes repeated increases and decreases changing to DN1, UP1, DN2 and so on, it is possible to measure the number of times the change between the increase and decrease of the signal occurs by counting the number of changes in the flag value, thus allowing the peak value in an arbitrary cycle to be set as the upper or lower peak value.

Further, the shorter the sampling intervals relative to the frequency of the clock-run-in signal (four times in the present embodiment), the higher the accuracy. This makes it possible to handle formats with a different clock-run-in frequency (e.g., closed caption and teletext).

Furthermore, by raising the analog signal above the pedestal level of the video signal prior to the input of the clock-run-in signal, it is possible for the control circuit to detect change in the CMP output immediately when the clock-run-in signal is input, thus allowing the analog signal to be increased in response thereto.

As described above, while specific description has been given of the embodiments of the present invention, the present invention is not limited to the above-described embodiments, and various variants or modifications are possible without departing from the spirit of the invention.

What is claimed is:

1. A data slicer circuit for separating, by using a pulse signal indicative of the presence/absence of data superimposed during specific scan periods of a video signal, the data from the video signal, the data slicer circuit comprising:
   a comparison circuit configured to compare the video signal with an analog signal, the comparison circuit outputting a result of the comparison;
   a control circuit configured to increase a digital signal by a constant interval if the video signal is larger than the analog signal, to decrease the digital signal by the constant interval if the video signal is smaller than the analog signal, and to output the digital signal, based on the result of the comparison of the comparison circuit; and
   a conversion circuit configured to convert the digital signal to the analog signal,
   wherein the analog signal depending on the result of the comparison of the comparison circuit is used as a slice level for separating the data from the video signal.

2. The data slicer circuit of claim 1, wherein the control circuit comprises a flag to indicate the increase/decrease of the digital signal.

3. The data slicer circuit of claim 1, wherein the control circuit includes:
   a first hold circuit to hold the value of the digital signal corresponding to an upper peak value of the analog signal; and
   a second hold circuit to hold the value of the digital signal corresponding to a lower peak value of the analog signal, and wherein
   the control circuit controls the value of the digital signal so that the value of the analog signal falls between the upper and lower peak values.

4. The data slicer circuit of claim 1, wherein the control circuit performs the sampling at a frequency higher than the frequency of the pulse signal.

5. The data slicer circuit of claims 1, wherein the control circuit raises the value of the analog signal to or above the value of the video signal prior to the input of the pulse signal.

6. The data slicer circuit of claim 1, wherein the control circuit varies the ratio of the increase to the decrease of the value of the analog signal based on a duty cycle of the comparison result output from the comparison circuit.

7. The data slicer circuit of claim 1, wherein the data slicer circuit is integrated.

8. A method for separating, by using a pulse signal indicative of the presence/absence of data superimposed during specific scan periods of a video signal, the data from the video signal, the method comprising:
   comparing the video signal with an analog signal;
   outputting a result of the comparison;
   increasing a digital signal by a constant interval if the video signal is larger than the analog signal, based on the result of the comparison of the comparison circuit;
   decreasing the digital signal by the constant interval if the video signal is smaller than the analog signal, based on the result of the comparison of the comparison circuit;
   outputting the digital signal; and
   converting the digital signal to the analog signal;
   wherein the analog signal depending on the result of the comparison is used as a slice level for separating the data from the video signal.

9. The method of claim 8, further comprising indicating the increase/decrease of the digital signal.

10. The method of claim 8, further comprising:
    holding the value of the digital signal corresponding to an upper peak value of the analog signal;
    holding the value of the digital signal corresponding to a lower peak value of the analog signal, and
    controlling the value of the digital signal so that the value of the analog signal falls between the upper and lower peak values.

11. The method of claim 8, further comprising performing sampling at a frequency higher than the frequency of the pulse signal.

12. The method of claims 8, further comprising raising the value of the analog signal to or above the value of the video signal prior to the input of the pulse signal.

13. The method of claim 8, further comprising varying the ratio of the increase to the decrease of the value of the analog signal based on a duty cycle of the result of the comparison.

* * * * *